(No Model.)
J. HINTERBERGER.
METALLIC BUSH AND BUNG FOR BARRELS.
No. 567,313. Patented Sept. 8, 1896.
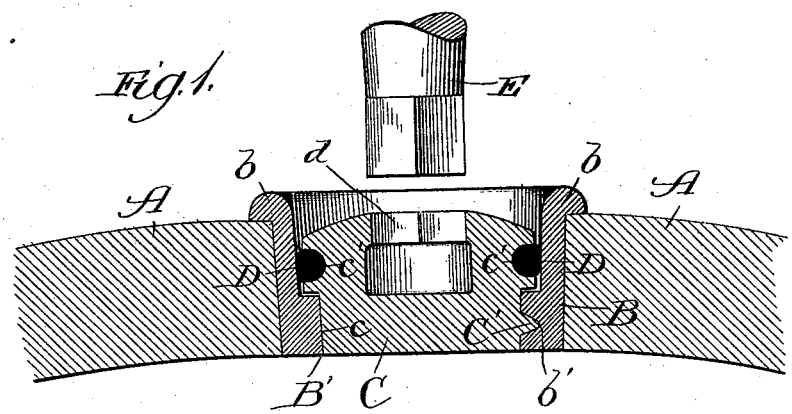
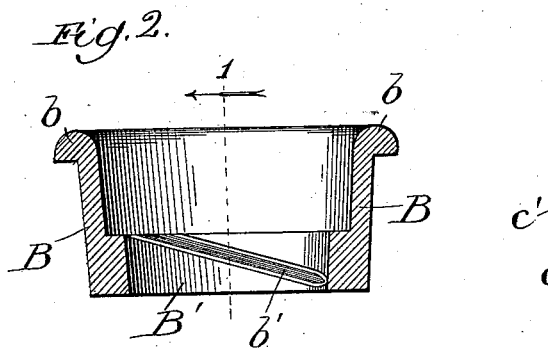
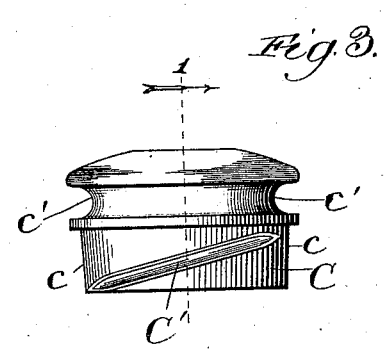
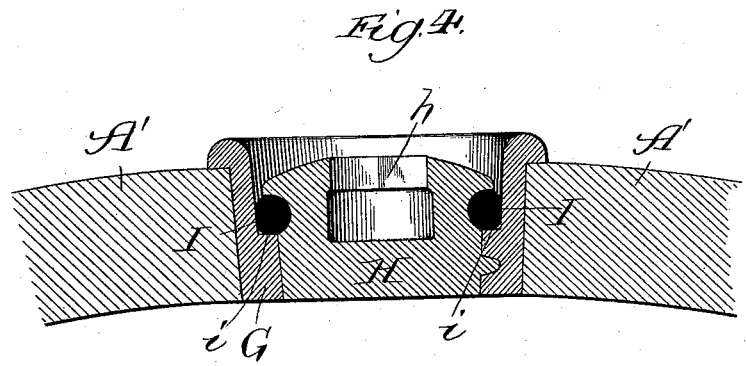
Witnesses:
Inventor:
Joseph Hinterberger,
By Banning & Banning & Sheridan,
Att'ys
THE NORRIS PETERS CO., PHOTO-LITHO., WASHINGTON, D. C.

UNITED STATES PATENT OFFICE.

JOSEPH HINTERBERGER, OF CHICAGO, ILLINOIS.

METALLIC BUSH AND BUNG FOR BARRELS.

SPECIFICATION forming part of Letters Patent No. 567,313, dated September 8, 1896.

Application filed January 5, 1895. Serial No. 533,932. (No model.)

*To all whom it may concern:*

Be it known that I, JOSEPH HINTERBERGER, a citizen of the United States, residing at Chicago, Illinois, have invented certain new and useful Improvements in Metallic Bushes and Bungs for Barrels, of which the following is a specification.

The object of my invention is to provide a simple, economical, and efficient bushing and bung especially adapted for use in connection with beer kegs and barrels; and my invention consists in the features and combinations hereinafter described and claimed.

In the drawings, Figure 1 is a vertical section of my improvement, showing its application in connection with a beer-keg; Fig. 2, a sectional view of the bushing removed from the keg; Fig. 3, an elevation of the bung, and Fig. 4 a sectional elevation of a modified form hereinafter described.

My invention relates especially to metallic bush and bungs as used in connection with beer-barrels, in which the bush is always fixed in the barrel, but the bung is adapted to be removed for the purpose of filling or cleaning, and it is intended to be an improvement upon existing structures in that the bung has a cylindrical portion which tightly fits an interior shouldered opening of the bushing, so as to minimize the escape of the gases. It is also provided with a projecting cam portion adapted to engage with a suitable cam-recess in the bushing to hold the parts securely together. It consists further in providing the bung with an annular grove, in which may be inserted a cushioned ring, which forms an air-tight seal and prevents the escape of any gases which might otherwise be forced out between the joint of the bush and bung.

In constructing my improvement and using it in connection with a keg or barrel A, I provide a metallic bushing B, provided with a shoulder $b$, that limits its insertion into the barrel. This bushing is firmly secured in the barrel by any convenient means; but I prefer to drive it in a suitable hole and depend on frictional engagement to hold the parts together. The bushing is provided with an interior shouldered opening, having preferably its lower portion $B'$ of a smaller diameter than the outer portion and tapered to fit the cylindrical portion of the bung. It is further provided with a cam-shaped recess $b'$, adapted to be engaged by a projection on the bung, as hereinafter described.

In order to provide a suitable bung for the above-described bushing, I make a cylindrical-shaped bung C, which has preferably its tapered portion, as at $c$, made to fit the smaller diameter of the bush when secured in place, as shown in Figs. 1 and 4, and prevent or minimize the escape of gases. This tapered portion is preferably provided with a projecting cam portion $C'$, adapted to engage with the cam-recess of the bushing and of substantially a corresponding shape, so that when the parts are in engagement this projecting cam enters the recess, and by turning the bung the parts are brought firmly together.

To further prevent or minimize the escape of any gases, the bung is provided with an anular groove $c'$, into which is fitted a cushioned ring D, so proportioned that when the bung and bush are in engagement, as shown in Fig. 1, the outer diameter of the cushioned ring is partially flattened, so as to form an air-tight joint and prevent any gases from escaping that might be forced out between the joint of the bung and the bush. The bung is further provided with a square axial opening $d$, in which a key-wrench E may be inserted for the purpose of turning the bung and removing it from the bush or for tightening the parts and preventing an easy disengagement of bush and bung.

In Fig. 4 I have shown a modification, in which the bush G is inserted in a barrel $A'$, of the general shape and construction shown in Fig. 1, the difference being in the bung H. The bung as before used is provided with a square axial opening $h$, in which a key-wrench may be inserted for the purpose of removing the bung from the bush or tightening the parts. The main difference of structure is that in the bung of the modification the annular groove is placed in such position that when the parts are in engagement the cushioned ring I bears not only against the large interior opening of the bush, but also against its shoulder, as at $i$, which further assists in making an air-tight joint.

The advantages of my improvement are that by providing a cylindrical portion to the bung proper and the opening in the bush adapted to fit the same a measurably airtight joint is provided, so that the escape of gases is minimized and the danger of destroying the texture of the cushion-ring is obviated, it being well known that if the cushioned ring—which is generally formed of rubber fabric—is contacted by the beer or its gases in large quantities they would speedily destroy the life of the rubber and render the ring useless. A further advantage is that a cushioned ring made in accordance with the above description and drawings prevents any air from entering the barrel or the escape of gases that might otherwise be forced through the joint.

I claim—

1. In metallic bush and bungs for barrels, the combination of a bushing provided with an interior shouldered opening, the smaller diameter adapted to fit the cylindrical portion of a bung and provided with a cam-shaped groove, a metallic bung provided with a cylindrical portion adapted to fit tightly the smaller interior opening of the bush a projecting cam to engage the cam-shaped recess of the bush and an annular groove in its head portion and a cushioned ring inserted in the annular groove so that when the parts are in engagement it forms an air-tight seal, substantially as described.

2. In metallic bush and bungs for barrels, the combination of a metallic bushing provided with a shouldered opening, the smaller diameter of which is tapered to fit the tapered portion of a bung and provided with a cam-shaped groove to receive a projecting cam on the bung, a metallic bung provided with a tapered cylindrical portion adapted to fit the tapered opening of the bush a projecting cam adapted to engage with the cam-shaped groove of the bush and secure the parts together an annular groove in the head of the bung adapted to receive a cushioned ring and a central square recess to receive a wrench for tightening or releasing the parts, and a cushioned ring inserted in the annular groove of the bung to form an air-tight seal when the parts are secured in place, substantially as described.

JOSEPH HINTERBERGER.

Witnesses:
 THOMAS F. SHERIDAN,
 EPHRAIM BANNING.